United States Patent
Hermstein et al.

[15] 3,681,688
[45] Aug. 1, 1972

[54] MEASURING DEVICE FOR CURRENTS IN HIGH VOLTAGE CONDUCTORS

[72] Inventors: Wolfgang Hermstein; Klaus Mollenbeck; Gerhard Gericke, all of Berlin, Germany

[73] Assignee: Siemens Aktiengesellschaft, Berlin, Munich, Germany

[22] Filed: July 23, 1970

[21] Appl. No.: 57,712

[30] Foreign Application Priority Data

July 13, 1969 Germany............P 19 39 514.3

[52] U.S. Cl.................................................324/96
[51] Int. Cl. ..............................................G01r 31/00
[58] Field of Search ....324/96; 250/230, 227; 356/24

[56] References Cited

UNITED STATES PATENTS 3,335,367  8/1967  Skooglund et al. ..............324/96
3,302,027  1/1967  Fried et al........................324/97

FOREIGN PATENTS OR APPLICATIONS 1,119,410  7/1968  Great Britain..................324/96
1,121,423  7/1968  Great Britain..................324/96

*Primary Examiner*—Alfred E. Smith
*Attorney*—Curt M. Avery, Arthur E. Wilfond, Herbert L. Lerner and Daniel J. Tick

[57] ABSTRACT

A transmitter emits beams at low voltage. A modulator at high voltage modulates the beams in accordance with a current to be measured. The modulator comprises an oscillating reflector oscillating in accordance with the current to be measured and modulates the beams impinging upon the reflector. A receiver at low voltage receives the modulated beams and converts them into a magnitude corresponding to the current to be measured. The reflector of the modulator reflects the modulated beams to the receiver.

16 Claims, 8 Drawing Figures

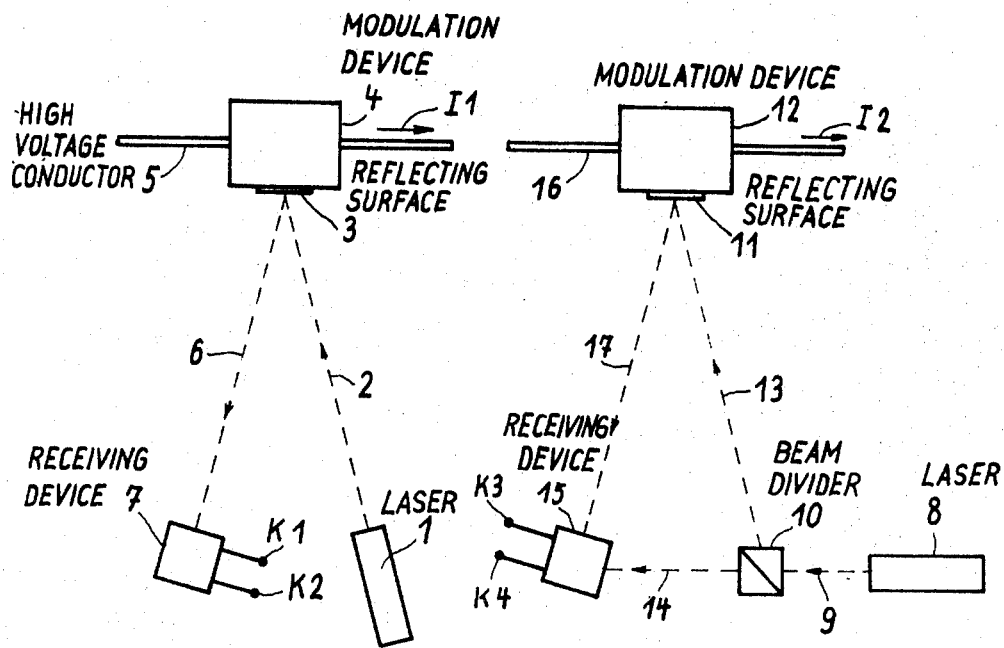
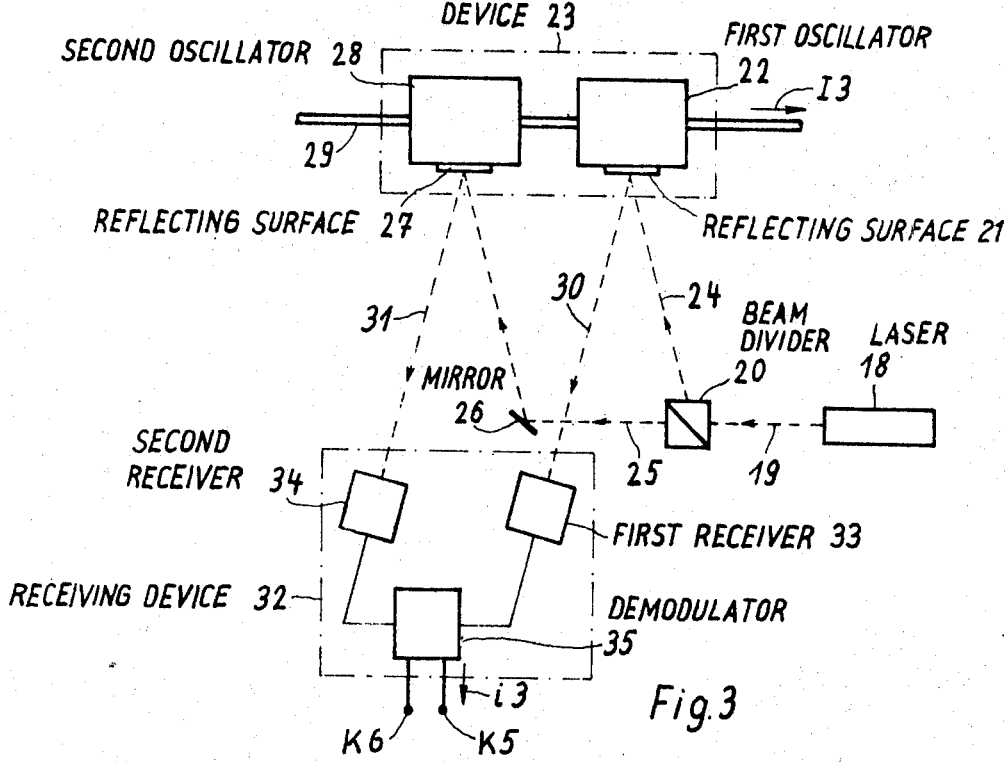

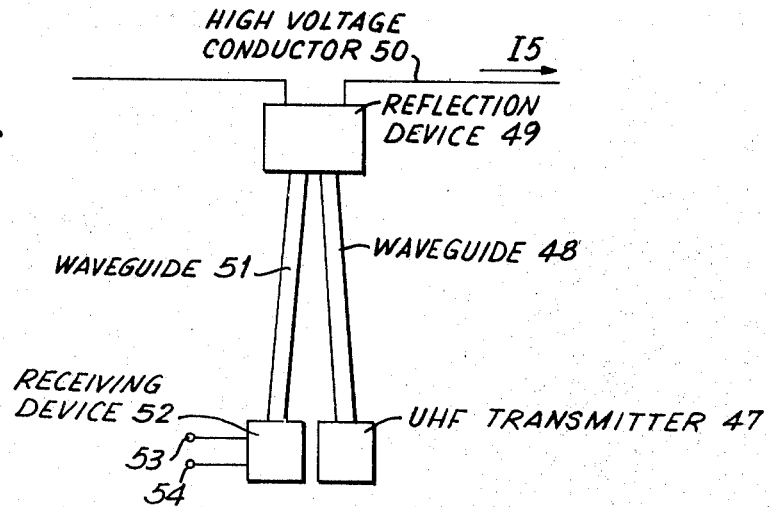
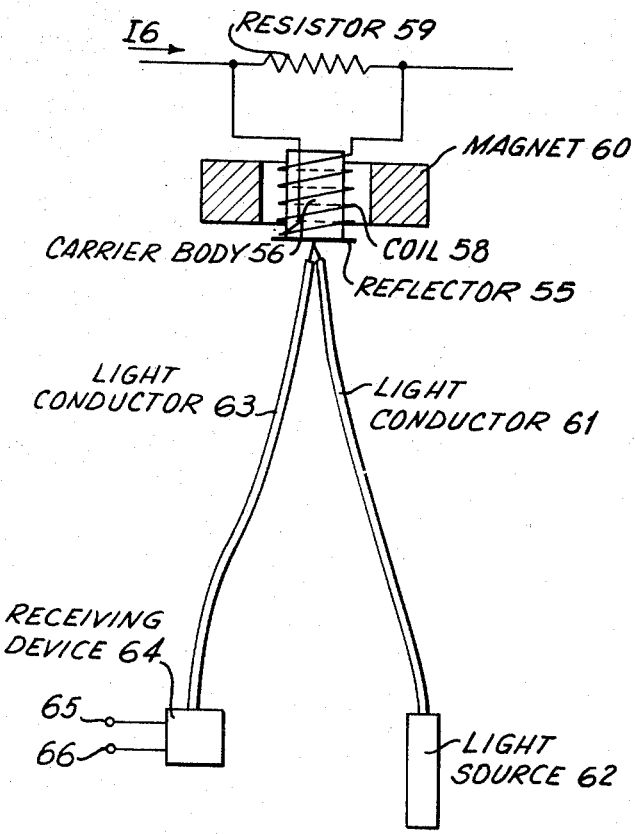
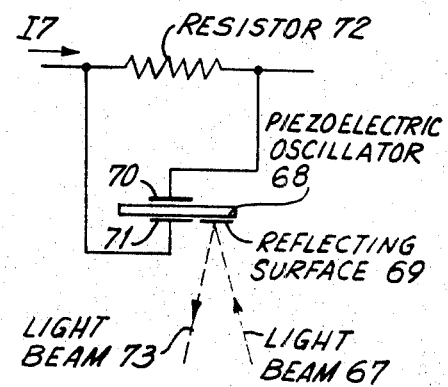

MEASURING DEVICE FOR CURRENTS IN HIGH VOLTAGE CONDUCTORS

DESCRIPTION OF THE INVENTION

The invention relates to a measuring device. More particularly, the invention relates to a measuring device for currents in high voltage conductors.

In the measuring device of the invention, light beams or microwave beams are transmitted by a transmitter at low voltage potential. The beams are modulated in a high voltage modulator in accordance with the current to be measured. The modulated beams are transmitted to a low voltage receiver in which they are converted into a magnitude corresponding to the current to be measured.

In a known measuring device of the aforedescribed type, the modulator or modulation device at high voltage comprises a thin disc of ferromagnetic material which is exposed to a magnetic field produced by the current to be measured. When the light beam passes through the modulation device, the plane of polarization is rotated in the thin disc. The extent of the rotation of the plane of polarization depends upon the field intensity of the magnetic field and thus depends upon the current to be measured. The light beam is reflected by a mirror after it passes through the thin disc, and preferably again penetrates said disc. After repenetrating the ferromagnetic disc, the light beam is demodulated in a low voltage receiver. The receiver produces an output, at its low voltage side, having a magnitude which is proportional to the magnitude of the current to be measured in the high voltage conductor. In another known measuring device, a microwave beam is transmitted from a low voltage transmitter, after polarization, to a circular waveguide at high voltage. The waveguide is positioned in a magnetic field produced by the current to be measured. In the waveguide, the plane of polarization is rotated by a ferrite rod in accordance with the current to be measured. The modulated microwave beam is then again reflected to the low voltage side, where it demodulated.

Difficulties arise in the known measuring devices due to the fact that the subassemblies or structures in the modulator and demodulator must be spatially well coordinated with each other. This necessitates a mechanical stabilization, which may be provided, for example, by an insulator comprising all the subassemblies or structures of the known measuring device. When the measuring device is utilized in a maximum voltage system or network, the required insulator has considerable dimensions in order to provide the required arcing distance. This makes the production of the insulator expensive. As a result, the entire measuring device is expensive, and this is a great disadvantage.

The principal object of the invention is to provide a new and improved measuring device for currents in high voltage conductors.

An object of the invention is to provide a measuring device for currents in high voltage conductors which overcomes the disadvantages of known similar type of devices.

An object of the invention is to provide a measuring device for currents in high voltage conductors, which device eliminates the necessity for an insulator.

An object of the invention is to provide a measuring device for currents in high voltage conductors, which device is inexpensive in production and operation.

An object of the invention is to provide a measuring device for currents in high voltage conductors, which operates with efficiency, effectiveness and reliability.

In accordance with the invention, a measuring device for currents in high voltage conductors comprises a transmitter for emitting beams at low voltage. A modulation device at high voltage modulates beams emitted by the transmitter in accordance with a current to be measured. The modulation device comprises an oscillating reflector oscillating in accordance with the current to be measured and modulates beams emitted by the transmitter and impinging upon the reflector. A receiver at low voltage receives the modulated beams from the modulation device and converting the modulated beams into a magnitude corresponding to the current to be measured. The oscillating reflector of the modulation device reflects the modulated beams to the receiver.

The beams may be light beams. The beams may be microwaves. The beams may be transmitted through the atmosphere between the transmitter and the modulation device and the modulated beams may be transmitted through the atmosphere between the modulation device and the receiver.

Light conducting fiber means may be provided between the transmitter and the modulation device for conducting the light beams and between the modulation device and the receiver for conducting the modulated light beams. Waveguides may be provided between the transmitter and the modulation device for conducting the microwaves and between the modulation device and the receiver for conducting the modulated microwaves.

The oscillating reflector may comprise magnetic means for producing a magnetic field having a field intensity corresponding to the current to be measured and a magnetostrictive oscillator having a reflecting surface exposed to the magnetic field.

The oscillating reflector may comprise a piezoelectric oscillator having a reflecting surface and voltage means for producing a voltage having a magnitude corresponding to the current to be measured and applying the voltage to the piezoelectric oscillator.

The oscillating reflector may comprise an electromagnetic moving coil oscillator having a mirror and current means for passing a current corresponding to the current to be measured to the moving coil oscillator.

A beam divider in proximity with the transmitter splits the beams emitted by the transmitter into two beams and directs one of the two beams to the modulation device and directs the other of the two beams to the receiver. The receiver utilizing the other of the two beams as a reference.

Base modulating means may be provided at the transmitter for modulating the beams emitted by the transmitter to suppress disturbances.

The modulating device may comprise a plurality of oscillating reflectors oscillating in accordance with the current to be measured and modulating beams emitted by the transmitter and impinging upon the reflectors thereby enlarging the measuring range. Each of the oscillating reflectors provides a corresponding measuring sub-range. The receiver comprises a plurality of receivers each receiving the modulated beams from a corresponding one of the oscillating reflectors. A beam divider in proximity with the transmitter for splitting the beams emitted by the transmitter into a plurality of beams and directing each of the plurality of beams to a corresponding one of the oscillating reflectors.

Another oscillating reflector having a known temperature characteristic may be provided for correcting the temperature-dependent operation of the oscillating reflector of the modulation device.

A protective screen in proximity with the reflecting surface of the magnetostrictive oscillator protects the reflecting surface from contamination and atmospheric influences. The magnetostrictive oscillator comprises a tube of magnetostrictive material and a high voltage conductor extending through the tube. The tube has a surface facing the transmitter and the receiver and including the reflecting surface. The tube of the magnetostrictive oscillator is of rectangular cross-section.

The measuring device of the invention thus utilizes the known Doppler effect in order to provide at the high voltage a frequency modulation of the light or microwave beams in accordance with the current to be measured. An exact alignment or adjustment of the individual structural components of the device is thus not required, since the reflector may be of relatively large size, without difficulty, and since the reflected and modulated beams may be transmitted to the receiver in a simple manner by utilizing a lens system. The oscillation amplitude of the reflector should thus be no less than the magnitude of the wavelength of the beams.

The free atmosphere may serve to conduct the beams between the components of the measuring device. This permits the elimination of the insulator. This is a principal advantage, since the insulator involves a considerable part of the production costs of a measuring device for currents in high voltage conductors, particularly if maximum voltages such as, for example, up to 1,500 kilovolts, are involved. When the voltage is 1,500 kilovolts, an arcing distance of approximately 32 meters is expected and requires an insulator of very large dimensions.

In the event that atmospheric conditions in the area of the measuring device make transmission via the free atmosphere difficult, without loss of reliability, it is of advantage to utilize light conductors for the light beams or waveguides for the microwave beams.

The reflector of the modulator preferably comprises a magnetostrictive oscillator since the magnitude of the magnetic field produced by the current to be measured causes the oscillator to oscillate without the need for additional switching devices. Another advantage of the magnetostrictive oscillator is that its oscillations are negligibly influenced by mass moment inertias. This advantage is also provided by the piezoelectric oscillator utilized as the reflector of the modulator. The piezoelectric oscillator is more costly than the magnetostrictive oscillator, since it oscillates only when the applied voltages are varied. As a result, the current to be measured must be converted, in each instance, into a proportional voltage at the high voltage side of the modulator. This requires the utilization of additional switching devices.

Since the receiver demodulates the light beam or microwave beam reflected from he high voltage side of the modulator, the beam divider is advantageously utilized. The beam divider splits the beams emitted from the transmitter into a beam directed toward the reflector of the modulator and a beam directed toward the receiver. The beam directed toward the high voltage side of the modulator is modulated in accordance with the current to be measured. The beam directed toward the receiver remains unmodulated. The modulated beam from the modulator and the unmodulated beam from the transmitter are received by the receiver, wherein the beam reflected from the modulator may be demodulated in a simple manner by any suitable means such as, for example, mixing or compensation, utilizing the unmodulated beam. Obviously, the demodulation of the light beams or microwave beams by mixing with an unmodulated beam is not the only way to demodulate the beam reflected from the modulation device. Any suitable known demodulation arrangement may be utilized for frequency demodulation in the receiver.

The light beams or microwave beams emitted from the transmitter may be base modulated in order to suppress disturbances. This avoids interference by external influences such as, for example, stray light.

The measuring device of the invention is intended to replace current transformers operating in accordance with the transformer principle in situations wherein, due to a very high voltage in the system, the insulation of the current transformers would be excessively expensive. Consequently, the measuring device of the invention must detect current values within a range which is customary in current transformers. This measuring range generally extends from 0.05 $I_N$ to 100 times $I_N$, wherein "$I_N$" means rated current. This measuring range cannot usually be covered by a single reflector such as, for example, a magnetostrictive oscillator. For this reason, it may be advantageous to utilize a plurality of reflectors in order to provide a large measuring range. Each of the reflectors determines the measuring values of a corresponding specific subrange. The reflectors are irradiated by the beams emitted by the transmitter via beam dividers. The receiver comprises a plurality of receivers each receiving the reflected beam from a corresponding one of the reflectors. It is advantageous if the sub-ranges of the reflectors overlap each other, since this assures a reliable determination of the current to be measured.

If the measuring device of the invention operates outdoors, and is thus subjected to relatively great temperature fluctuations, the influence of the temperature-dependent operation of the oscillator or reflector on the accuracy of the measurement must be accounted for. In order to avoid such inaccuracies, an additional oscillator or reflector having a known temperature characteristic or operation may be utilized to correct the temperature-dependent operation of the other oscillator or oscillators.

The protective screen for the reflecting surface of the reflector or oscillator protects the measuring device against contamination and atmospheric influences, since in the event of such contamination the entire measuring device fails to operate. It may generally be expected that the oscillations of the reflector clean the area automatically. If this is not the case, however, dust may be removed by turbulence in particularly difficult cases.

In order that the invention may be readily carried into effect, it will now be described with reference to the accompanying drawings, wherein:

FIG. 1 is a schematic block diagram of an embodiment of the measuring device of the invention for currents in high voltage conductors;

FIG. 2 is a schematic block diagram of another embodiment of the measuring device of the invention for currents in high voltage conductors;

FIG. 3 is a schematic block diagram of another embodiment of the measuring device of the invention for currents in high voltage conductors;

FIG. 6 is a schematic block diagram of another embodiment of the measuring device of the invention for currents in high voltage conductors;

FIG. 7 is a schematic diagram of another embodiment of the measuring device of the invention for currents in high voltage conductors; and FIG. 8 is a schematic diagram of part of another embodiment of the measuring device of the invention for currents in high voltage conductors.

Figure 4:
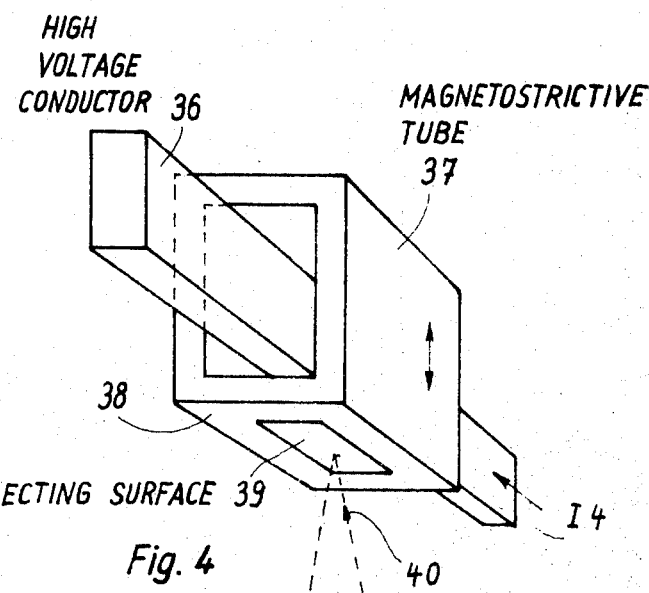
FIG. 4 is a schematic diagram of a magnetostrictive oscillator utilized as the reflector of the modulator.

In FIG. 1, a transmitter 1 of low voltage may comprise, for example, a laser. The laser 1 emits a laser beam 2 which is directed toward, and impinges upon, a reflecting surface 3 of a modulation device or modulator 4 at high voltage. The modulation device 4 is provided on a high voltage conductor 5 through which the current I1 to be measured flows.

In a manner not illustrated in FIG. 1, the reflecting surface 3 is oscillated by the current I1 to be measured. The laser beam 2 impinging upon the reflecting surface 3 is thus frequency modulated due to the stroke movement of said reflecting surface by utilizing the Doppler effect, and is reflected as a frequency modulated beam 6 at the low voltage side of the reflector or reflecting surface 3. The frequency modulated beam 6 impinges upon a receiving device or receiver 7 which demodulates said beam. An output signal or measurement is provided at output terminals K1 and K2 of the receiver 7 and is proportional to the magnitude of the current I1 in the high voltage conductor 5.

When the reflecting surface 3 moves in the direction of the impinging light or laser beam 2, the frequency of said beam is decreased or increased, depending upon whether said reflecting surface moves toward or away from said beam, as described by the Doppler effect. Naturally, the movements of the reflecting surface 3 are provided in rhythm with the frequency of the current to be measured. However, the frequency modulation of the laser beam 2 depends upon the direction of movement and the movement of the reflecting surface 3 per unit time and, therefore, on the magnitude of the amplitude of deflection which occurs within a period of the current to be measured, in positive and negative directions.

In FIG. 2, a transmitter 8 may comprise, for example, a laser. The laser 8 emits a laser beam 9 which impinges upon a beam divider 10 at low voltage. The beam divider 10 splits the laser beam 9 into a beam 13 directed toward a reflecting surface 11 of a modulation device or modulator 12 at high voltage, and another beam 14 which is directed toward a receiving device or receiver 15. The laser beam 13 impinges upon the high voltage side of the reflector or reflecting surface 11 and is frequency modulated at a high voltage conductor 16 by said reflector in accordance with the current I2 to be measured. A frequency modulated reflected beam 17 is directed from the reflector 11 to the receiver 15 and the unmodulated beam 14 from the beam divider 10 is directed toward said receiver. The receiver demodulates the frequency modulated beam 17 by utilization of the unmodulated beam 14 and produces at output terminals K3 and K4 an output signal or measurement which is proportional to the current I2 to be measured in the high voltage conductor 16. The demodulation in the receiver may be provided by any known demodulation method such as, for example, mixing.

In the embodiment of FIG. 3, a larger measuring range is provided. A transmitter 18, which may comprise, for example, a laser, emits a laser beam 19. The laser beam 19 is directed toward a beam divider 20 which splits said laser beam into a beam 24 directed toward a reflecting surface or reflector 21 of a first oscillator 22 of a modulation device or modulator 23, and another beam 25 directed toward a mirror or reflector 26. The mirror 26 reflects the beam 25 toward a reflecting surface or reflector 27 of a second oscillator 28 of the modulation device 23. Each of the reflecting surfaces 21 and 27 produces frequency modulated beams 30 and 31, respectively, which are reflected toward a receiving device or receiver 32.

The beams 30 and 31 are frequency modulated in accordance with the magnitude of the current I3 to be measured which flows through a voltage conductor 29. The receiving device 32 comprises a first receiver 33 and a second receiver 34. The beam 30 from the reflector 21 is directed toward, and received by, the first receiver 33. The beam 31 from the reflector 27 is directed toward, and received by, the second receiver 34. The first and second receivers 33 and 34, respectively, are connected to a demodulator 35. The demodulator 35 produces at output terminals K5 and K6 an output signal or measurement such as, for example, a current i3, which is proportional to the magnitude of the current I3 to be measured in the high voltage conductor 29.

FIG. 4 illustrates a magnetostrictive oscillator which may be utilized as the oscillating reflector, reflector or oscillator of the modulation device of the invention. A high voltage conductor 36 comprising a bar or rod of rectangular cross-section extends through a tube 37 of magnetostrictive material. A reflecting surface 39 is provided on the surface 38 of the magnetostrictive tube 37 facing the transmitter and receiver of the measuring device. The reflecting surface 39 reflects a beam 40 emitted from the transmitter. The reflecting surface 39 is rigidly affixed to the magnetostrictive tube 37 and thus oscillates with said tube. The oscillations depend upon the field intensity of the magnetic field produced by the current I4 flowing through the high voltage conductor 36. The current I4 is the current to be measured. The reflecting surface 39 therefore frequency modulates the beam 40 as a result of the Doppler effect. The magnetostrictive tube 37 has a rectangular cross-section.

Figure 5:
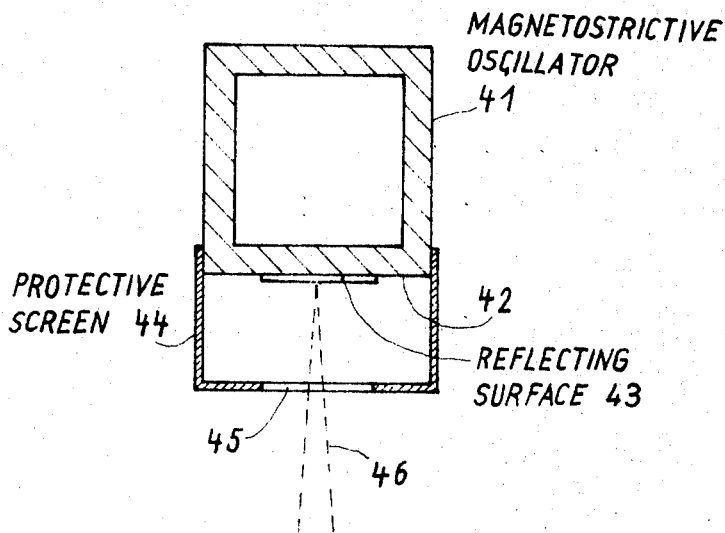
FIG. 5 is a schematic sectional view of a reflector having a protective screen.

FIG. 5 is a cross-section of a magnetostrictive oscillator 41 having a rectangular cross-section. The high voltage conductor is not shown in FIG. 5 in order to maintain the clarity of illustration. The magnetostrictive oscillator 41 has a reflecting surface 43 on its surface 42 facing the transmitter or receiver of the measuring device. Neither the transmitter nor the receiver of the measuring device is shown in FIGS. 4 or 5 in order to maintain the clarity of illustration. A protective screen 44 is provided in proximity with and surrounding the surface 42 of the magnetostrictive oscillator 41. The protective screen 44 protects the reflecting surface 43 from contamination and atmospheric influences. The protective screen 44 has a single opening 45 formed therethrough to permit the passage of a beam 46 and its reflected beam. The protective screen 44 also functions as a drip catch.

The measuring device of the invention is suitable for the measurement of currents in high voltage conductors and is very inexpensive with regard to the modulation at high voltage. Furthermore, the maintenance requirements of the measuring device of the invention are nil, with regard to the modulation device at high voltage. Furthermore, the measuring device of the invention requires no insulator, so that it is very economical.

FIG. 6 is a schematic diagram of another embodiment of the measuring device of the invention. In the embodiment of FIG. 6, the measuring device includes a UHF transmitter 47 coupled, via a waveguide 48, to a reflection device 49 on the high voltage side. The UHF transmitter supplies microwave beams. The reflection device 49 measures or detects a current I5 to be measured, flowing in a high voltage conductor 50 and modulates the microwave beams with a signal corresponding to the current to be measured in accordance with the principle of the Doppler effect. The modulated microwave beams are directed from the reflection device 49 to a receiving device 52 via a waveguide 51. The receiving device 52 demodulates the modulated microwave beams. A current proportional to the current I5 to be measured, in the high voltage conductor 50 is provided at output terminals 53 and 54 of the receiving device 52.

The reflection device 49 may comprise the reflector of FIGS. 4, 5 or 8. The waveguide 48 which guides the microwaves to the reflection device 49 is preferably of insulating material, since only such a waveguide may effect the necessary voltage reduction between the high voltage and the low voltage. The waveguides 48 and 51 are dimensioned primarily from the viewpoint that they will reliably prevent impairments in the transmission path between the low voltage and high voltage paths caused by fog or solid particles or objects. A fact to be considered is that the losses in a waveguide of synthetic insulating material should not become too great.

FIG. 7 is a schematic diagram of another embodiment of the measuring device of the invention. In the embodiment of FIG. 7, a reflector which comprises a coil oscillator, having a reflector 55. The reflector 55 is affixed to a carrier body 56. A coil 58 is mounted on the carrier body 56. The ends of the coil 58 are connected to a resistor 59 through which a current I6, proportional to the current to be measured, flows. The coil 58 is positioned within a permanent magnet 60 and oscillates in accordance with the current I6 to be measured.

Light is transmitted to the reflector 55 via a light-conducting fiber bundle or light conductor 61, on the low voltage side, from a light source 62. The light, which is reflected by the reflector 55 and is modulated in accordance with the current I6 to be measured, is delivered via another light-conducting fiber bundle or light conductor 63, to a receiving device 64, on the low voltage side. The receiving device 64 demodulates the modulated light. A measured quantity which is proportional to the current I6 to be measured is then provided at output terminals 65 and 66 of the receiving device 64.

FIG. 8 is a schematic diagram of the modulating device on the high voltage side of another embodiment of the measuring device of the present invention. In the embodiment of FIG. 8, a light beam is transmitted by a light source on the low voltage side light source, and not shown in FIG. 8. The light beam is modulated by a piezoelectric oscillator 68 provided with a reflecting surface 69.

The piezoelectric oscillator 68 has two electrodes 70 and 71 and is connected via said electrodes to a resistor 72. A current I7, proportional to the current to be measured flows through the resistor 72. The piezoelectric oscillator 68 modulates the light beam 67 in accordance with the current I7 to be measured. Thus, the light beam 73, reflected by the reflecting surface 69, is reflected as a modulated light beam to a receiving device (not shown in FIG. 8) on the low voltage side.

If an embodiment of the measuring device of the invention is to have a correction with respect to the temperature-dependent behavior of the oscillator, then the second oscillator 28 of the embodiment of FIG. 3 should be replaced by a comparison oscillator, whose temperature behavior or characteristic is known. When such a comparison oscillator is utilized, a correction magnitude or quantity is supplied to the first receiver 33 from the second receiver 34, on the low voltage side of the measuring device, in the embodiment of FIG. 3. A demodulator, and preferably also an amplifier, is connected to the first receiver 33.

The second oscillator 28 of FIG. 3 has a known temperature behavior or characteristic which corresponds to that of the first oscillator 22. The second oscillator 28 may be energized by a constant auxiliary current, for example, via a saturation current transformer at the high voltage conductor 29. The embodiment of FIG. 3 may be modified by providing the oscillator utilized for temperature correction at low voltage potential and energizing said oscillator by a constant current derived from a separate auxiliary voltage source.

The energizing of the oscillator provided for temperature correction by a constant current results in the light or microwave beams reflected by the oscillator having a basic modulation determined by the constant current and another modulation which depends upon the temperature.

A comparison frequency may be used to assist in producing a correction quantity to filter the signal stemming from the temperature change out of the light beam reflected by the oscillator provided for temperature correction. This may be accomplished, for example, by mixing. The correction quantity is a measure of the temperature dependency of the oscillators. If the correction quantity is supplied to the first receiver 33, a measured quantity may be provided which remains uninfluenced by temperature changes. To accomplish this, the correction quantity, with its phase shifted by 180°, is superimposed by the light or microwave beams reflected by the first oscillator 22.

An alternative is to feed the light or microwave beams of both oscillators to a non-adjusted bridge.

While the invention has been described by means of specific embodiments and in specific examples, we do not wish to be limited thereto, for obvious modifications will occur to those skilled in the art without departing from the spirit and scope of the invention.

We claim:

1. A measuring device for currents in high voltage conductors, comprising
    a transmitter for emitting beams at low voltage;
    a modulation device at high voltage for modulating beams emitted by said transmitter in accordance with a current to be measured, said modulation device comprising a reflector which oscillates in accordance with the current to be measured and the oscillations of which are in the direction of the beams emitted by said transmitter, said reflector modulating the frequency of the beams impinging upon said reflector by utilizing the Doppler effect; and
    a receiver at low voltage for receiving the modulated beams from said modulation device and converting said modulared beams into a magnitude corresponding to the current to be measured, the oscillating reflector of said modulation device reflecting said modulated beams to said receiver.

2. A measuring device as claimed in claim 1, wherein said beams are light beams.

3. A measuring device as claimed in claim 1, wherein said beams are microwaves.

4. A measuring device as claimed in claim 1, wherein said beams are transmitted through the atmosphere between said transmitter and said modulation device and said modulated beams are transmitted through the atmosphere between said modulation device and said receiver.

5. A measuring device as claimed in claim 1, wherein said beams are light beams, and further comprising light conducting fiber means between said transmitter and said modulation device for conducting said light beams and between said modulation device and said receiver for conducting the modulated light beams.

6. A measuring device as claimed in claim 1, wherein said beams are microwaves, and further comprising waveguides between said transmitter and said modulation device for conducting said microwaves and between said modulation device and said receiver for conducting the modulated microwaves.

7. A measuring device as claimed in claim 1, wherein said oscillating reflector comprises magnetic means for producing a magnetic field having a field intensity corresponding to the current to be measured and a magnetostrictive oscillator having a reflecting surface exposed to said magnetic field.

8. A measuring device as claimed in claim 1, wherein said oscillating reflector comprises a piezoelectric oscillator having a reflecting surface and voltage means for producing a voltage having a magnitude corresponding to the current to be measured and applying said voltage to said piezoelectric oscillator.

9. A measuring device as claimed in claim 1, wherein said oscillating reflector comprises an electromagnetic moving coil oscillator having a mirror and current means for passing a current corresponding to the current to be measured to said moving coil oscillator.

10. A measuring device as claimed in claim 1, further comprising a beam divider in proximity with said transmitter for splitting the beams emitted by said transmitter into two beams and directing one of the two beams to said modulation device and directing the other of the two beams to said receiver, said receiver utilizing said other of said two beams as a reference.

11. A measuring device as claimed in claim 1, further comprising base modulating means at said transmitter for modulating the beams emitted by said transmitter to suppress disturbances.

12. A measuring device as claimed in claim 1, wherein said modulation device comprises a plurality of oscillating reflectors oscillating in accordance with the current to be measured and modulating beams emitted by said transmitter and impinging upon said reflectors thereby enlarging the measuring range, each of said oscillating reflectors providing a corresponding measuring sub-range, and said receiver comprises a plurality of receivers each receiving the modulated beams from a corresponding one of said oscillating reflectors, and further comprising a beam divider in proximity with said transmitter for splitting the beams emitted by said transmitter into a plurality of beams and directing each of said plurality of beams to a corresponding one of said oscillating reflectors.

13. A measuring device as claimed in claim 1, further comprising another oscillating reflector having a known temperature characteristic for correcting the temperature-dependent operation of the oscillating reflector of said modulation device.

14. A measuring device as claimed in claim 7, further comprising a protective screen in proximity with the reflecting surface of said magnetostrictive oscillator for protecting said reflecting surface from contamination and atmospheric influences.

15. A measuring device as claimed in claim 7, wherein said magnetostrictive oscillator comprises a tube of magnetostrictive material and a high voltage conductor extending through said tube, said tube having a surface facing said transmitter and said receiver and including said reflecting surface.

16. A measuring device as claimed in claim 15, wherein the tube of said magnetostrictive oscillator is of rectangular cross-section.

* * * * *

UNITED STATES PATENT OFFICE
CERTIFICATE OF CORRECTION

Patent No. 3,681,688                    Dated   August 1, 1972

Inventor(s)  WOLFGANG HERMSTEIN, ET AL

It is certified that error appears in the above-identified patent and that said Letters Patent are hereby corrected as shown below:

In the heading to the printed specification, line 11,

"July 13, 1969    Germany    P 19 39 514.3"  should read

--July 31, 1969    Germany    P 19 39 514.3--.

Signed and sealed this 25th day of December 1973.

(SEAL)
Attest:

EDWARD M. FLETCHER, JR.          RENE D. TEGTMEYER
Attesting Officer                Acting Commissioner of Patents